July 8, 1958 A. E. CUTLER 2,841,886
RADAR SIMULATING APPARATUS
Filed Sept. 22, 1954 3 Sheets-Sheet 1
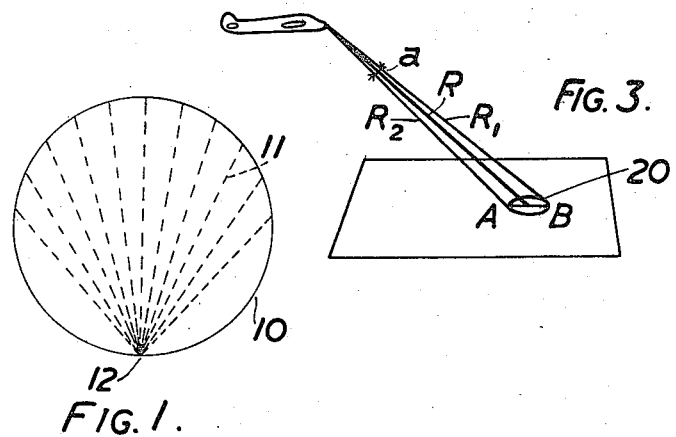
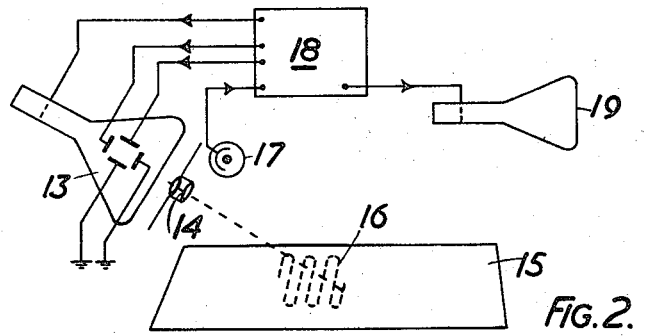
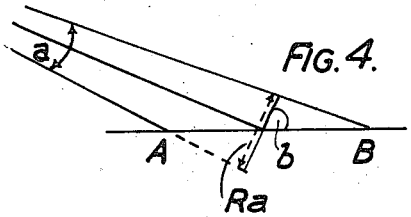
INVENTOR
Albert Ernest Cutler
BY George Hoovey
ATTORNEY

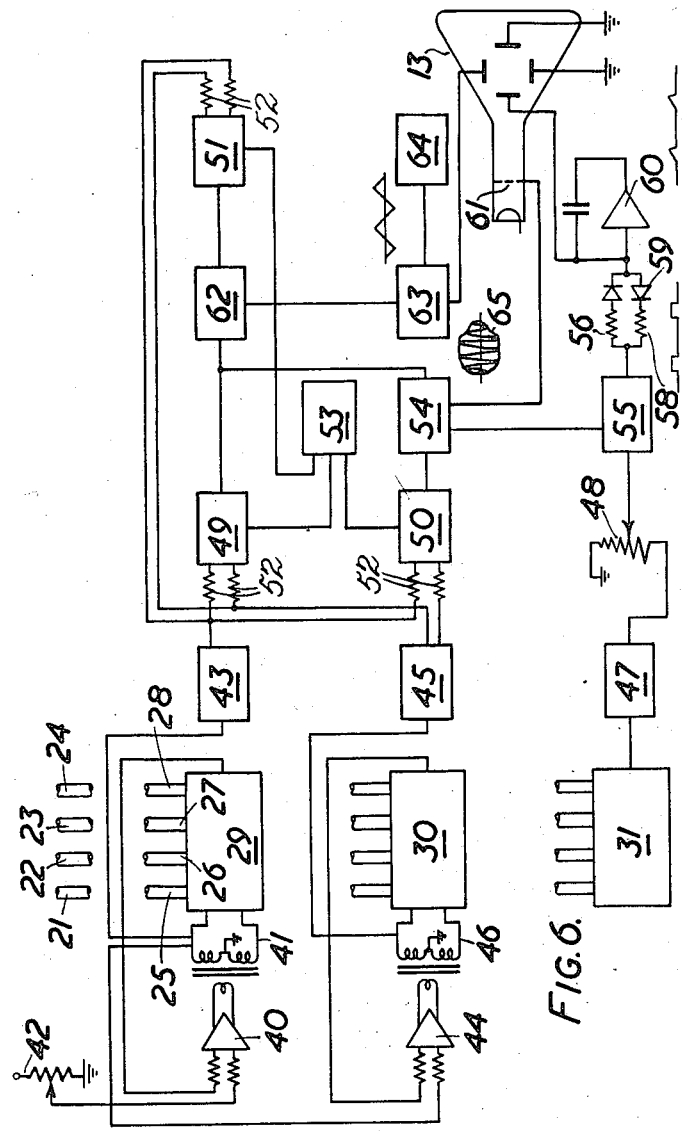

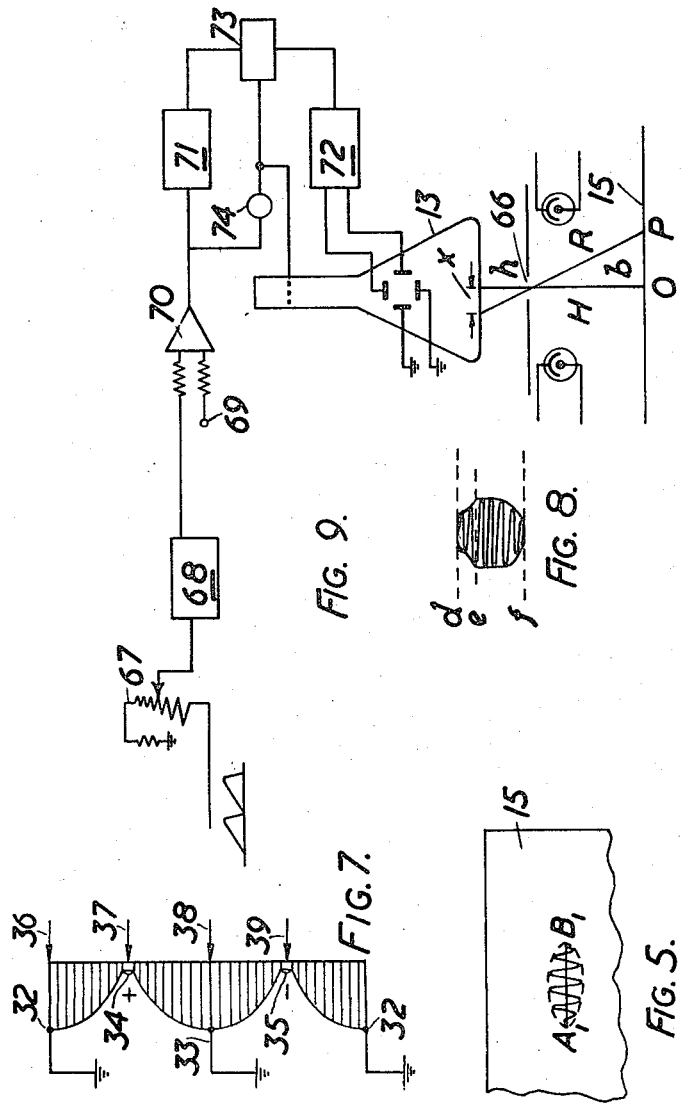

2,841,886

RADAR SIMULATING APPARATUS

Albert Ernest Cutler, Crawley, England, assignor to Communications Patents Limited Application September 22, 1954, Serial No. 457,695

Claims priority, application Great Britain October 1, 1953

10 Claims. (Cl. 35—10.4)

This invention relates to the provision of "ground returns" signals in radar simulating apparatus.

It has been proposed, for the training of radar operators, to provide apparatus including a viewing screen on which traces are produced by synthetically-generated electric signals representing radar echoes. It has been usual to obtain "ground returns" signals using a water tank through which sound waves are transmitted and at the bottom of which suitable reflecting surfaces are provided to represent features of a selected area of the surface of the earth. A disadvantage of this method is that the scale of the representation of the selected area in the tank is fixed as the ratio of the velocity of light to the velocity of sound in water, that is approximately $2 \times 10^5:1$ or about three miles to the inch. This is frequently too small to allow the inclusion of as much detail as is desirable. Furthermore difficulties are encountered in the focusing of the compression waves and the maintenance of the tank.

In the specification of our co-pending patent application of Albert Ernest Cutler, Serial No. 457,694, filed September 22, 1954, now abandoned, there is claimed radar training apparatus for providing on a viewing screen synthetic representations of radar echoes reflected from features on the earth's surface, including a source of electromagnetic waves, a chart on which radar features of the earth's surface are represented by areas which absorb the electromagnetic waves to different degrees, means adapted to detect electromagnetic waves received from portions of the chart and to apply corresponding electric signals, representing ground echoes, to a display means which includes a viewing screen adapted to be scanned, and means ensuring that the portion of the chart from which electromagnetic waves are received at any moment corresponds to the area of the earth's surface which is represented at that moment by the portion of the viewing screen which is being scanned.

The specification of patent application of Albert Ernest Cutler, Serial No. 457,694, filed September 22, 1954, describes apparatus in which a light spot on the screen of a cathode ray tube scans a chart of the radar features of an area of the earth's surface and a photo-electric device provides electric signals corresponding to the light which is transmitted through or reflected from the surface of the chart, this tube and a cathode ray display tube to which the ground echo signals are applied being scanned in synchronism. This apparatus is suitable for simulating the appearance of "ground returns" on radar equipment at or near ground level, but does not take into account the effect of altitude on the appearance of the "ground returns."

It is an object of the present invention to provide apparatus for simulating the appearance of "ground returns" on airborne radar equipment, which is not dependent on echo times for indicating ranges.

According to one aspect of the invention, radar training apparatus for providing on a viewing screen, representing the viewing screen of an airborne radar unit, synthetic representations of radar echoes reflected from features on the earth's surface, includes a chart on which the radar features of an area of the earth's surface are represented, a source of electromagnetic waves arranged to co-operate with the chart to generate electric signals representing the said radar features, means controlled by the electric signals to establish corresponding traces on the viewing screen, and means for modifying the position of the traces in accordance with the altitude of the simulated radar unit above the ground.

According to another aspect of the invention, radar training apparatus for providing on a viewing screen, representing the viewing screen of an airborne radar unit, synthetic representations of radar echoes reflected from features on the earth's surface, includes a cathode ray display tube, a chart on which the radar features of an area of the earth's surface are represented, a source of electromagnetic waves arranged ot co-operate with the chart to generate electric signals representing radar echoes from the said features for application to the display tube, and means controlled in accordance with the altitude of the simulated radar unit to control the application of the echo signals to the control circuit of the cathode ray display tube so that no ground echo is indicated on the latter at a range which is less than the altitude of the said unit.

According to a further aspect of the invention, radar training apparatus for providing on a viewing screen synthetic representations of radar echoes reflected from features on the earth's surface, the viewing screen representing that of an airborne forward-seeking radar installation, includes a display tube, means adapted to generate suitable scanning potentials for the display tube, a chart on which the radar features of an area of the earth's surface are represented, a source of electro-magnetic waves arranged to co-operate with the chart to generate electric signals representing ground echoes for application to the display tube, computing means controlled in accordance with the altitude of the simulated radar unit and the direction of the simulated radar beam to compute the slant range at which ground echoes can be received, and means controlled by the computing means whereby the application of ground echo signals to the display tube is prevented when the range defined by the scanning potentials is not substantially equal to the computed slant range.

In order that the invention may be better understood, two embodiments thereof will now be described, by way of example only, with reference to the accompanying drawings, in which:

Figure 1 illustrates the type of radar display to be simulated by the apparatus according to a first embodiment of the invention;

Figure 2 shows the general arrangement of the apparatus in the first embodiment;

Figures 3, 4 and 5 are diagrams illustrating the operation of the apparatus of Figure 2;

Figure 6 shows the computing circuits for the apparatus of Figure 2;

Figure 7 illustrates one of the computing elements;

Figure 8 is a further diagram illustrating the operation of the apparatus of Figure 2; and Figure 9 shows diagrammatically apparatus according to a second embodiment of the invention.

The first embodiment relates to apparatus for simulating the appearance of "ground returns" on the viewing screen of a forward-seeking radar equipment which is mounted on an aircraft and is arranged to be variable in elevation and train.

The general arrangement of the parts of the apparatus and its principle of operation will be first described, and the details of the computing apparatus will be given thereafter.

The type of radar display which is given by such radar equipment is shown in Figure 1, which shows a viewing screen 10 on which the dotted lines 11, representing the successive range scanning lines, radiate from a pole 12 which represents the position of the aircraft on which the radar equipment is mounted, the range of any indicated echo increasing with its distance from the pole. As the angle of train of the radar beam is varied, the range lines scan from one side of the screen to the other. As the angle of depression of the radar beam is varied, more slowly than the variation of the angle of train, the range of the echoes which are received from the ground also varies, and as a result arcuate bands of ground echoes of increasing or decreasing range are successively displayed on the screen as the axis of the radar beam scans in train and in elevation.

In the apparatus for simulating such a radar display, a light beam from the screen of a cathode ray tube 13 is focused by a lens system 14 onto a chart surface 15 (Fig. 2), on which parts of the ground surface which reflect the radar beam to different degrees are represented in different tones of grey. The cathode ray tube 13 is arranged to follow the assumed scanning movements of the radar beam in train and elevation, so that the illuminated area on the surface of the chart 15 follows a path such as that indicated by the dotted line 16. A photo-electric cell 17 above the chart 15 provides an electric signal which represents the amplitude of the echo from the portion of the earth's surface corresponding to the illuminated area on the chart, and this electric signal is applied through a computing unit 18 to the grid of a display tube 19, on the screen of which a scanning raster of the kind shown in Figure 1 is generated, the variation of the angle of train of the simulated scanning beam, shown by the movement of the range scanning lines across the screen of the display tube 19, being synchronized with the variation of the train angle of the cathode ray tube 13. In order that the ground echo for any given direction of radiation of the simulated radar beam shall appear on the screen of the tube 19 only at an indicated range corresponding to the actual slant range of the ground from the simulated radar aerial in this direction, the slant range is computed in the unit 18 from known data relating to the assumed altitude of the radar aerial above the ground and the angle of depression made by the scanning beam with the horizontal, the surface of the earth being assumed plane. The computed range signals are caused to provide, during each range scanning line on the display tube, a pulse which is delayed in proportion to the range, and these pulses are used to gate the grid circuit of the cathode ray tube 13, i. e. to gate the light source, thereby providing light pulses and preventing the application of echo signals to the display tube 19 during periods which correspond to ranges from which no ground echoes could be received. The grid circuit of the display tube 19 may also be gated by similarly-timed pulses to prevent spurious traces.

The cathode ray tube 13 is mounted for angular movement about three mutually perpendicular axes corresponding to the principal axes of the aircraft on which the radar equipment is assumed to be mounted, this angular movement being controlled in accordance with the assumed angular movement of the aircraft about its principal axes. If however, the radar aerial is assumed to be mounted on a platform which is gyro-stabilized in pitch and roll, the cathode ray tube 13 follows only change of heading of the aircraft.

The cathode ray tube 13 is also mounted for linear movement above the chart in three mutually perpendicular directions, so that the tube can be given a movement of translation in any direction, in accordance with assumed corresponding movement of the aircraft. The tube 13 can be mounted on a gantry including three perpendicular lead-screws which are rotated in accordance with the speeds of the craft in the corresponding directions.

The range computor 18 is supplied with data (for example in the form of electric potentials or shaft rotations) relating to the altitude $h$ of the aircraft above the ground, the angles of pitch and roll of the aircraft with respect to axes parallel to the plane of the earth's surface ($\theta$ and $\phi$), and the angles of train and elevation of the radar aerial with respect to the aircraft axes (T, E). The data relating to the altitude and the pitch and roll angles of the aircraft, together with the data regarding the angular and linear movement of the aircraft which is required to control the movement of the cathode ray tube 13, can be derived from the settings of the flying controls in a dummy aircraft under the control of a pupil.

It can be shown that for a radar beam of very small width, the slant range of that part of the earth's surface from which the echo is received is given by the expression:

$$R = \frac{h}{\cos E . \sin T . \cos \theta . \sin \phi - \cos E . \cos T . \sin \theta - \sin E . \cos \theta . \cos \phi}$$

If the aerial is assumed to be mounted on a gyro-stabilised platform, $\theta$ and $\phi$ are zero, and the expression for range simplifies to:

$$R = \frac{h}{\sin E}$$

In practice, the beam is rarely of very small width so that, assuming the beam to be of circular cross-section, the area of the earth's surface which receives a pulse radiated from the radar aerial is defined by an ellipse 20 (Fig. 2), the major axis AB of which varies in length with the angle of incidence of the beam.

An echo from the point A will be received at a time $t_0$ after the radiation of a pulse, and an echo from the point B will be received at a time $t_2$ after the radiation of the pulse, $t_2$ being later than $t_0$.

To simulate this variation in the delay of the ground echoes resulting from a single pulse, it is first necessary for the unit 18 to compute the maximum and minimum ranges $R_1$ and $R_2$ (Fig. 3) from which echoes may be received from the ground, for a given beam width $a$. It will be seen from Figure 4 that the major axis AB of the ellipse is of length $$R.a. \sec b$$

where $b$ is the angle made by the beam with the vertical.

The projection of this along the beam is given by $$R.a. \tan b$$

which is approximately equal to $R.a \sec b$ over the range (greater than 60°) which would normally be required for the angle $b$. Thus all points within the range.

$$R\left(1 \pm \frac{a. \sec b}{2}\right)$$

may provide ground echoes.

The length of the period during which echoes can be received, i. e. the interval between the receipt of a pulse from A and the receipt of a pulse from B, is given by $$\frac{2R.a. \sec b}{c}$$

where $c$ is the speed of light. During each range scanning line on the display tube, electric pulses delayed in accordance with the ranges ($R - R.a. \sec b$) and ($R + R.a. \sec b$) are used to open and close a gate in the grid circuit of the scanning cathode ray tube 13 to prevent illumination of the chart outside the period during which ground echoes can be received.

Referring again to Figure 4, it has been shown that a radar echo from point A on the earth's surface will be received before an echo from B. It is therefore necessary to introduce artificially this echo delay, which is not present in the scaled-down photoelectric system. To achieve this, the scanning light beam is made much narrower than the radar beam and the spot on the face of the scanning tube is made to follow a vertical line such that during each light pulse the light spot on the chart will scan a line on the chart, corresponding to the line AB, at the appropriate time and speed. The cathode ray tube is prevented from rotating about its own longitudinal axis in order to insure that the scanning trace on the tube is always vertical.

The time taken by the spot to scan the line on the scanning tube face must be made to vary with the expression $$\frac{2R.a. \sec b}{c}$$

i. e. it varies with the angle $b$. As the angular width $a$ of the radar beam, and therefore also the travel of the spot on the cathode ray tube, remain constant, the speed of the spot on the tube face must be made to vary with the length of AB, i. e. with $b$. The relationship can be found as follows:

The projection of AB along the radar beam (Fig. 4) is approximately $R.a. \sec b$, and the time interval between the reception of echoes from the points A and B is approximately $$\frac{2R.a. \sec b}{c}$$

The total travel of the spot on the cathode ray tube 13 (Fig. 2) is proportional to $a$, so that the speed of the spot on the cathode ray tube for a given angle $a$ is given by $$\text{speed} = \frac{\text{displacement}}{\text{time}} = \frac{k.a.}{R.a. \sec b} = \frac{k}{R. \sec b} = \frac{k}{h} \times \cos^2 b$$

since $R = h \sec b$, $k$ being a constant.

The required displacement of the spot at any instant $t_1$, between $t_0$, the instant the beam reaches $A$, and $t_2$, the instant the beam reaches B, is given by:

$$k \int_{t_0}^{t_1} \frac{\cos^2 b}{h} dt$$

To achieve his displacement of the spot on the scanning cathode ray tube at the required time, during each range scanning line on the display tube 19 electric pulses delayed in accordance with the ranges $R - R.a. \sec b$ and $R + a. \sec b$ open and close an electronic gate, a voltage $$\frac{k}{h} \cos^2 b$$

being fed, while the gate is open, to a Miller integrator with a short discharge time, the grid voltage of which is fed to the Y deflection plates of the scanning cathode ray tube.

In the preferred embodiment of the invention, the apparatus is further modified in order to simulate more closely the appearance of a ground echo on a radar display tube. The area of the earth's surface which receives the pulse is in the form of an ellipse, i. e. its width across the middle is greater than its width at the ends. As a consequence, a point on the ground which is in the path of the middle of the beam is in the beam longer than a point on the ground which is in path of an end of the beam. The effect of this is that traces corresponding to echoes produced by areas traversed by the middle of the beam are elongated in the direction of motion of the beam. To simulate this effect, the light spot on the chart 15 is given a rapid transverse oscillatory movement as it scans from $A_1$ to $B_1$ (Fig. 5), the transverse movement being of greater amplitude in the middle of the range than at the ends.

Apparatus for providing the required scanning and grid potentials for the cathode ray tube 13 is shown diagrammatically in Figure 6. Shafts 21, 22, 23 and 24 provide mechanical inputs, in the form of shaft rotations, which represent E, T, $\theta$ and $\phi$ and which are applied to a computer 29 through the intermediary of input shafts 25, 26, 27 and 28 respectively, and to computers 30 and 31 by way of corresponding input shafts.

The computer 29 forms an attenuator with gain cos $b$. The value of cos $b$ is given by $$\cos b = \frac{h}{R}$$

$= \cos E. \sin T. \cos \theta. \sin \phi - \cos E. \cos T. \sin \theta - \sin E. \cos \theta. \cos \phi$ The computer 29 includes drum-type contoured potentiometers shaped to give sine and cosine output voltages, the wipers of these potentiometers being respectively adjusted according to the values of E, T, $\theta$ and $\phi$. The form of such a contoured sine-cosine potentiometer is diagrammatically illustrated in Figure 7, which shows the potentiometer opened out so as to lie in one plane (the ends 32 being normally joined together). This winding is such that when it is earthed at the ends 32 and at the diametrically opposite point 33, and is provided with A. C. input voltages of equal amplitude but opposite phase at the two intermediate diametrically opposite points 34 and 35 (the polarity indications in the figure referring to the instantaneous conditions), the wipers 36 and 37 which are maintained at a constant angular spacing of 90°, provide output voltages which are proportional to the sine and cosine respectively of the angle of rotation (e. g. $\theta$) of the wipers from a reference position. The voltage outputs of the wipers 36 and 37 are, of course, also proportional to the amplitude of the input voltages which are applied to the contacts 34 and 35. Additional wipers 38 and 39 may be provided at angular spacings of 180° and 270° from the wiper 36, to obtain voltages representing $-\sin \theta$ and $-\cos \theta$ respectively.

The term cos E. sin T. cos $\theta$. sin $\phi$ is obtained by connecting four such potentiometers in series, the wipers of the four potentiometers being rotated by the shafts 25, 26, 27 and 28 respectively. Thus the wipers of the E potentiometer which provide output voltages representing cos E and $-\cos$ E are connected to the input contacts of the T potentiometer, from which voltages representing cos E. sin T and $-\cos$ E. sin T are applied to the $\theta$ potentiometer, and so on. The voltages representing the three terms cos E. sin T. cos $\theta$. sin $\phi$, $-\cos$ E. cos T. sin $\theta$, and $-\sin$ E. cos $\theta$, cos $\phi$ are then applied through suitable weighting resistors to a summing amplifier.

The computer 29 is inserted in the feed-back loop of a high-gain amplifier 40 having a centre-tapped output transformer 41. This amplifier receives an input signal from a potentiometer 42, the wiper of which is adjusted to give an output signal representative of the altitude $h$ of the aircraft. The output of the amplifier represents $$h \sec b = R$$

and is applied to a phase-sensitive demodulator 43.

The computer 30 is similar in structure and function to the computer 29 and is arranged in a similar circuit, but the second input signal of the amplifier 44, associated with the computer 30, is taken from the output transformer 41 of amplifier 40, instead of the $h$ potentiometer. A signal representing the quantity $$h \sec^2 b = R \sec b$$

is applied to the phase-sensitive demodulator 45 from the output transformer 46.

The computer 31, which is similar in structure to the computer 29, provides an output signal which represents cos $b$. This signal is applied to a square-law device 47, which may be of any known kind. The resultant signal is applied to a potentiometer 48 the wiper of which is adjusted in accordance with the height $h$ of the aircraft and which is so contoured that the signal at its wiper is inversely proportional to $h$ and represents the quantity $$\frac{K \cos^2 b}{h}$$

i. e. the rate of scan of the cathode ray tube.

The output signals $R$ and $\pm R \sec b$ from the phase-sensitive demodulators 43 and 45 are algebraically added in each of the comparators 49, 50 and 51, which have input weighting resistors such as 52 of suitable values to give signals representing $$R(1-a \sec b), R(1+a \sec b)$$

and $$R\left(1+\frac{a}{2} \sec b\right)$$

respectively. The range sweep voltage of the display tube is also applied to the compartors from the display tube time base 53. The output signals from the comparators 49, 50 and 51 are in the form of pulses occurring at moments within the range sweep corresponding to the ranges $$R(1-a \sec b), R(1+a \sec b)$$

and $$R\left(1+\frac{a}{2} \sec b\right)$$

The pulses from the comparators 49 and 50, corresponding to the maximum and minimum ranges of points receiving the radar pulse, are fed to opposite grids of a flip-flop 54, one anode of which controls a gate circuit 55. During the period between the pulses the gate circuit is open and feeds the voltage $$\frac{K \cos^2 b}{h}$$

which represents the required scanning speed, by way of the resistor-rectifier paths 56—57 and 58—59 to a Miller integrator 60 having a short discharge time, the grid voltage of which is fed to the Y deflection plates of the scanning cathode ray tube 13. The resistor 56 is given a high value and the resistor 58 a low value to provide slow-to-change and quick-to-discharge characteristics. The flip-flop 54 also applies a gating potential to the grid 61 of this tube, so that the chart is illuminated by the light beam only during the period between the pulses.

Output pulses from the comparators 49 and 51, corresponding to the ranges $$R(1-a \sec b)$$

and $$R\left(1+\frac{a}{2} \sec b\right)$$

are applied to opposite grids of a flip-flop 62, which opens a gate circuit 63 for the period between the pulses. This gate is combined with a delay modulator circuit which is fed with a signal of triangular waveform from a generator 64 while the gate is open. The output signal is of the form shown at 65, and is applied to the X plates of the scanning cathode ray tube 13. The form of the scanning raster on the face of this tube is shown in Figure 8, the dotted lines $f$, $d$ and $e$ representing the ranges $$R(1-a \sec b), R(1+a \sec b)$$

and $$R\left(1+\frac{a}{2} \sec b\right)$$

respectively.

Thus the chart 15 will be scanned by a series of pulses of light, each light pulse being so timed during a range sweep of the display tube 19 that the resulting trace on the screen of the latter appears at the correct range. To take into account the width of the beam, each light pulse is made to scan a small ellipse on the chart at a speed which is controlled in accordance with the computed angle of incidence of the radar beam at the surface of the earth.

The gating signal which is applied to the cathode ray tube 13 from the flip-flop 54 may also be used to ensure that no traces appear on the screen of the display tube 19 while there is no light spot on the face of the tube 13.

Echoes from portions of the ground which are traversed by the middle of the radar beam appear brighter than echoes from those portions of the ends of the beam. If it is desired to simulate this, the grid of the cathode ray tube 13 can be modulated inversely as the distance of the scanning light beam from the centre of the ellipse (i. e. so that the scanning spot is brightest when it is at the centre of the ellipse), for example by utilising signals obtained by rectifying and summing the deflection potentials used to produce the ellipse.

If a P. P. I. radar unit is located on a gyro-stabilised platform in an aircraft, and is of the radial scanning type, apparatus according to a second embodiment of the invention, shown diagrammatically in Figure 9, can be used to provide ground returns. In the case of a real aircraft carrying radar, the radar pulse will reach points along the line OP at progressively later instants, and the difference in the slant range of points O and P (and therefore the delay between the arrival of the pulse at O and its arrival at P) will vary with the height of the aircraft. This effect must be simulated in the scanning of the chart surface 15 by the light beam from the cathode ray tube 13.

It will be seen from Figure 9 that the range R of point P from the aperture 66 is given by $R=H \sec b$, where H is the height of the aircraft and $b$ is the angle made by the beam to point P with the vertical. Also the displacement $x$ of the light spot on the tube face is given in terms of the distance $h$ of the aperture from the tube face, by:

$$x = h \tan b$$
$$= h\sqrt{\sec^2 b - 1}$$
$$= h\sqrt{\left(\frac{R}{H}\right)^2 - 1}$$

If the line OP on the chart surface is to be scanned at the required speed, since the range R is proportional to the echo delay, or $R=ct$, the displacement $x$ is given by $$x = h\sqrt{\left(\frac{ct}{H}\right)^2 - 1}$$

A circuit for obtaining this signal is shown in Figure 9. The range sweep signal is applied to a potentiometer 67 the wiper of which is adjusted in accordance with the value of H. The potentiometer 67 is so contoured that the signal varies inversely with H, the displacement of its wiper, this signal representing the quantity $$\frac{ct}{H}$$

This signal is applied to a square-law device 68 which is arranged to provide an output voltage representing $$+\left(\frac{ct}{H}\right)^2$$

A signal of constant amplitude representing the quantity $-1$ is obtained from terminal 69, and is added to the signal from the device 68 in a summing amplifier 70. The output of the amplifier 70 is fed to a square-root device 71 which also multiplies the square-root of the signal $$\left(\frac{ct}{H}\right)^2 - 1$$

by a constant factor representing $h$. The signal from the square-root device 71 represents $x$, the displacement of the spot on the tube face, and is applied to a resolver 72 which applies suitable potentials to the X and Y plates of the scanning tube 13, through a gate 73.

In order to prevent displacement of the spot on the tube face when the quantity $$\sqrt{\left(\frac{ct}{H}\right)^2 - 1}$$

is imaginary, i. e. when the echo delay $ct$ represents a range which is less than H, or before the radar beam strikes the ground at its nearest point, an electronic switch 74 receives from the amplifier 70 the signal representing $$\left(\frac{ct}{H}\right)^2 - 1$$

and operates when this quantity is negative to close the gate 73.

The appearance of clouds and of interference such as "window" can be simulated by placing pieces of a material, for example cotton wool, on the chart which is to be scanned by the light beam.

What I claim is:

1. Radar training apparatus for producing on a viewing screen corresponding to the viewing screen of a radar unit in an aircraft moving in space synthetic representations simulating radar echoes transmitted from the radar unit to and reflected from features of the earth's surface, comprising a chart bearing on the surface thereof a representation of features of the earth's surface, means for projecting upon said chart surface a beam of electromagnetic waves so as to be reflected therefrom in correspondance to said features, said means being capable of effecting three dimensional movement of said beam relative to said chart corresponding to assumed movements of the radar unit, means operatively connected to the flight controls of said training apparatus continuously to compute the slant range from the radar unit to the ground in response to the setting of said controls from data representing the various movements of the radar unit, a display tube, means responsive to said reflections of electromagnetic waves from said chart surface to produce electric signals and operatively connected to said display tube to display on said display tube in response to said signals a reproduction of features represented on said chart, means to apply range scanning potentials to said display tube at a high repetition frequency, and means operatively connected to said computing means for controlling the operation of said display tube in response to the computed value of the slant range to produce visible markings on said display tube only when the range scanning potential is in a predetermined time relation to the computed slant range.

2. Radar training apparatus as defined in claim 1 which comprises means for effecting translational movement of said beam toward and away from said chart surface in accordance with the altitude set by said flight control, and means responsive to a signal representing said altitude and connected to said beam projecting means to control the emission of said electromagnetic waves so as to prevent display on said display tube at a range less than said set altitude.

3. Radar training apparatus as defined in claim 1 in which said slant range computing means also computes the range limits within which ground echoes may be received, said computing means being connected to said beam projecting means for controlling the emission of electromagnetic waves and the signals produced by said means responsive to the reflections of said waves from said chart surface to control said display tube to form a display pattern over a portion of the tube corresponding to the range lying between said limits.

4. Radar training apparatus as defined in claim 1 comprising a pick-up device sensitive to changes in said reflections of said electromagnetic waves and connected to said computing means and to said display tube to determine the display on said display tube only when the transmission of said signals to said display tube is determined by said computing means.

5. Radar training apparatus as defined in claim 1 in which said computing means provides a signal varying with the set altitude of the aircraft and the set direction of its radar beam for controlling the distance between said projecting means and said chart surface and the direction of projection of said beam, said computing means also being connected to said beam projecting means for controlling the emission of electromagnetic waves to effect the formation of visible markings in predetermined positions on the range scanning lines of said display tube.

6. Radar training apparatus as defined in claim 1 in which said beam projecting means projects a light beam and is operable for effecting scanning movement of said light beam over said chart surface, said means responsive to said reflections from said chart surface comprising a photoelectric device disposed to receive light reflected from the scanned area of said chart and capable of generating electric signals in response to said reflected light to effect display on said display tube in response to said electric signals corresponding to the features of the scanned area of said chart.

7. Radar training apparatus as defined in claim 6 in which scanning movement of said light beam is gated in accordance with the limits of range between which echo signals are assumed to be obtainable so as to illuminate the chart only during the period when echo signals can be received, the light beam moving from the nearest point on the chart from which echoes can be received to the farthest point during the period of illumination of the chart.

8. Radar training apparatus as defined in claim 1 in which said beam projecting means is operable for oscillatory movement of said beam over said chart surface concomitantly with angular movement of said beam transversely of said surface from said nearest point on said chart to the farthest point thereon.

9. Radar training apparatus as defined in claim 8 which comprises means for brightening the scanning light beam adjacent the center of its movement.

10. Radar training apparatus for producing on a viewing screen corresponding to the viewing screen of a radar unit on an aircraft moving in space synthetic representations simulating radar echoes transmitted from the radar unit to and reflected from features of the earth's surface, comprising a chart bearing on the surface thereof a representation of features of the earth's surface, means for projecting upon said chart surface a beam of electromagnetic waves so as to be reflected therefrom in correspondence to said features, said means being capable of effecting scanning movement of said beam transversely of the direction of projection generally over said chart surface and transversely of said chart surface, means responsive to reflections of said electromagnetic waves from said chart surface to produce electric signals, a viewing screen connected to said responsive means and provided with means actuated by said signals to produce on said viewing screen a reproduction of features represented on said chart, and computing means connected to said projecting means and to said viewing screen for computing and transmitting to said viewing screen a signal having a time delay relative to said electric signal produced by said reflection in proportion to the slant range.

References Cited in the file of this patent

UNITED STATES PATENTS

| | | |
|---|---|---|
| 2,102,139 | Vance | Dec. 14, 1937 |
| 2,406,751 | Emerson | Sept. 3, 1946 |

(Other references on following page)

UNITED STATES PATENTS

| | | |
|---|---|---|
| 2,470,912 | Best et al. | May 24, 1949 |
| 2,524,847 | Springer | Oct. 10, 1950 |
| 2,591,752 | Wicklund | Apr. 8, 1952 |
| 2,652,636 | Garman et al. | Sept. 22, 1953 |
| 2,720,039 | Brown | Oct. 11, 1955 |
| 2,737,730 | Spencer | Mar. 13, 1956 |
| 2,788,588 | Lindley | Apr. 16, 1957 |

OTHER REFERENCES

Dummer-Aids to Training—The Design of Radar Synthetic Training Devices for the R. A. F.—Proceedings of Institution of Electrical Engineers, part 3, March 1949, pages 101 to 112.